United States Patent
Yamada et al.

[11] Patent Number: 6,133,178
[45] Date of Patent: Oct. 17, 2000

[54] HIGH PURITY TRANSPARENT SILICA GLASS

[75] Inventors: Nobusuke Yamada, Atsugi; Shinkichi Hashimoto, Yokohama; Koji Tsukuma, Tsukuba; Tomoyuki Akiyama, Yamagata; Yoshikazu Kikuchi, Sagae; Hideaki Segawa, Yamagata, all of Japan

[73] Assignees: Tosoh Corporation, Shinnanyo; Nippon Silica Glass Co., Ltd., Tokyo, both of Japan

[21] Appl. No.: 09/204,160

[22] Filed: Dec. 3, 1998

[30] Foreign Application Priority Data

Dec. 3, 1997 [JP] Japan .................................. 9-332764

[51] Int. Cl.⁷ ...................................................... C03C 3/06
[52] U.S. Cl. .................................................. 501/54
[58] Field of Search .................................. 501/54

[56] References Cited

U.S. PATENT DOCUMENTS

| | | |
|---|---|---|
| 4,113,844 | 9/1978 | Tokimoto, et al. . |
| 5,349,456 | 9/1994 | Iwanaga et al. ............ 501/54 |
| 5,665,133 | 9/1997 | Orii et al. .................. 501/54 |
| 5,729,090 | 3/1998 | Scott et al. ................. 501/54 |
| 5,977,000 | 11/1999 | Sato et al. ................. 501/54 |

FOREIGN PATENT DOCUMENTS

| | | |
|---|---|---|
| 0 360 659 | 3/1990 | European Pat. Off. . |
| 0 711 736 | 5/1996 | European Pat. Off. . |
| 35-791 | 2/1960 | Japan . |
| 59-129421 | 7/1984 | Japan . |
| 4-65328 | 3/1992 | Japan . |
| 6-24771 | 7/1994 | Japan . |
| 7-61827 | 3/1995 | Japan . |
| 7-300341 | 11/1995 | Japan . |
| 8-165134 | 6/1996 | Japan . |
| 8-175840 | 7/1996 | Japan . |
| 9-183623 | 7/1997 | Japan . |
| 9-202631 | 8/1997 | Japan . |
| 9-202632 | 8/1997 | Japan . |

*Primary Examiner*—Karl Group
*Attorney, Agent, or Firm*—Oblon, Spivak, McClelland, Maier & Neustadt, P.C.

[57] ABSTRACT

A high-purity transparent silica glass containing Fe, Na and K impurities each in an amount of 0.01–0.3 ppm, and an OH group in an amount of 0–3 ppm; among the Fe impurities, the content of metallic Fe having a valency of +0 being not larger than 0.1 ppm. This transparent silica glass exhibits, even when it is maintained at 900–1,400° C. for at least 20 hours, an extinction coefficient of not larger than 0.009 at a wavelength of 400 nm, and does not become colored as visually examined. The silica glass is made by a process wherein powdery silica filled in a mold cavity is melted at 1,700° C. or higher, characterized in that the melting is conducted in a graphite mold having a porous high-purity graphite layer provided on the mold inner surface so that the filled silica is not contacted with the mold; said porous layer having a bulk density of 0.1–1.5 g/cm³, and the content of each of Fe, Na and K impurities in the porous layer being not larger than 1 ppm.

2 Claims, 4 Drawing Sheets

HIGH PURITY TRANSPARENT SILICA GLASS

BACKGROUND OF THE INVENTION (1) Field of the Invention

This invention relates to a high-purity transparent silica glass, and a process for producing the silica glass.

The high-purity transparent silica glass of the present invention is characterized, even when it is maintained at a high temperature for a long period, as exhibiting a good transparency and not developing color. Therefore, the silica glass is suitable, for example, for heat-resistant jigs for a semiconductor, flanges and furnace tubes.

(2) Description of the Related Art

In recent years, the degree of integration in semiconductor integrated circuits is more and more enhanced. Therefore glass not containing sodium element or potassium element as impurities giving a harmful influence on semiconductor integrated circuits is desired as a material for jigs used for the production of a semiconductor. Thus, for example, a member for heat-treating a semiconductor, containing not larger than 0.05 ppm of each of sodium, potassium and lithium elements, has been proposed in Japanese Unexamined Patent Publication (hereinafter abbreviated to "JP-A") No. S59-129421. It also is desired to reduce the content of iron element giving a harmful influence on a semiconductor. Thus, for example, silica glass having an iron content of smaller than 0.8 ppm has been proposed in JP-A H8-165134 and JP-A H8-175840.

In another aspect, the size of a wafer for semiconductor integrated circuits is becoming large year by year, and thus, the size of a silica glass jig for heat-treating a semiconductor also is becoming large. Therefore, a material for a silica glass jig for heat-treating a semiconductor, which exhibits a high viscosity at a high temperature, is required. In general a silica glass article exhibiting a high viscosity at a high temperature is made by melting a natural crystalline quartz powder.

A process for producing a silica glass ring has been proposed in Japanese Examined Patent Publication (hereinafter abbreviated to "JP-B") No. S35-791 wherein a ring-shaped mold cavity is filled with a crystalline silica powder and the silica powder is heated to 1,700° C. or higher to be thereby molten. A process for producing a silica glass article has been proposed in JP-A H9-202631, JP-A H9-202632 and JP-A H9-183623 wherein a silica powder is heated to be thereby molten in a graphite mold characterized as having a silica glass layer interposed between the inner wall of the graphite mold and the silica powder filled therein.

In the case where a mold made of a heat-resistant metal or carbon is used for melt-molding a natural quartz powder, the mold is placed in vacuo so that the mold is not subject to oxidative degradation at a high temperature. Where a graphite mold made of general-purpose graphite is used, a problem arises such that the molten transparent silica glass becomes tinged with brown. Even if the as-molten transparent silica glass does not become tinged with brown, when the silica glass molding is fabricated, for example, by welding, and then annealed at a temperature of 900 to 1,400° C. for about 20 hours to remove an internal stress, the resulting transparent glass article is tinged with brown, leading to lowering of the quality of glass article. However, the content of metal impurities in the transparent silica glass does not always have direct effect on whether the transparent silica glass becomes or does not become tinged with brown, and the reason for the brown color development further requires elucidation.

JP-B S35-791 has proposed the use of a mold made of molybdenum, which is a heat-resistant metal. This proposal has a problem such that the molybdenum is subject to oxidation at a high temperature to be thereby partially gasified, and the silica glass is contaminated with the gasified molybdenum.

When a mold made of graphite is used, the mold and the silica glass tend to be melt-adhered together by the reaction between the carbon and silica at a high temperature. Even when the melt-adhesion does not occur, the durability of the mold is becomes poor. Further, a graphite material generally contains metal impurities such as iron and calcium in a quantity of far larger than 1 ppm, which are gasified at a high temperature and the silica glass is contaminated therewith. This problem can be avoided by the above-mentioned process proposed in JP-A H9-202631, JP-A H9-202632 and JP-A H9-183623 wherein a graphite mold a silica glass layer interposed between the inner wall of the graphite mold and the silica powder filled therein. This proposed process is not advantageous from an economical view point because the silica glass is expensive and the fabrication of the silica glass into the layer to be fitted in the mold is troublesome.

SUMMARY OF THE INVENTION

A primary object of the present invention is to provide a process for producing high-purity transparent silica glass which is characterized, even when it is maintained at a high temperature for a long period, as exhibiting a good transparency and not developing color, and which is industrially advantageously produced.

In one aspect of the present invention, there is provided a high-purity transparent silica glass containing iron, sodium and potassium impurities each in an amount of 0.01 to 0.3 ppm, and a hydroxyl group in an amount of 0 to 3 ppm; among the iron impurities, the content of metallic iron having a valency of +0 being not larger than 0.1 ppm; said transparent silica glass being characterized as, even when the glass is maintained at a temperature in the range of from 900 to 1,400° C. for at least 20 hours, exhibiting an extinction coefficient of not larger than 0.009 at a wavelength of 400 nm, and being not colored as visually examined.

In another aspect of the present invention, there is provided a process for producing the high-purity transparent silica glass as described above, wherein a mold cavity is filled with powdery silica and the silica is melted by heating to a temperature of at least 1,700° C., characterized in that the heating of the powdery silica is conducted in a mold made of graphite and having a porous high-purity graphite layer provided on the inner surface of the mold so that the filled silica is not in contact with the mold; said porous high-purity graphite layer having a bulk density of from 0.1 to 1.5 g/cm³, and the content of each of iron, sodium and potassium impurities in the porous high-purity graphite layer being not larger than 1 ppm.

DESCRIPTION OF THE PREFERRED EMBODIMENTS

Figure 1:
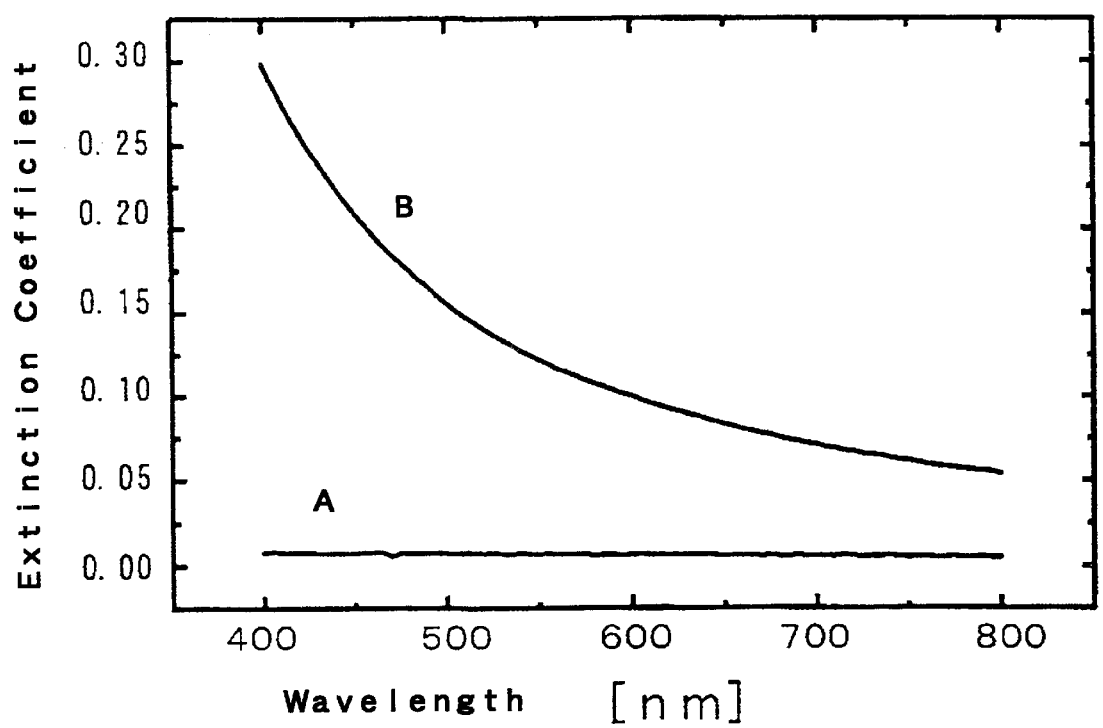
FIG. 1 shows visible spectrums of a silica glass made in Example 1 and that made in Comparative Example 1.

The high-purity transparent silica glass of the present invention is characterized as containing iron, sodium and potassium impurities each in an amount of 0.01 to 0.3 ppm, and a hydroxyl group in an amount of 0 to 3 ppm; and, among the iron impurities, the content of metallic iron having a valency of +0 is not larger than 0.1 ppm. Further, this transparent silica glass is characterized as, even when the glass is maintained at a temperature in the range of from 900 to 1,400° C. for at least 20 hours, exhibiting an extinction coefficient of not larger than 0.009 at a wavelength of 400 nm, and being not colored as visually examined.

The process for producing the high-purity transparent silica glass will be described.

As a raw material for the silica glass, a high-purity crystalline quartz powder or a high-purity amorphous silica powder, which has a content of each of iron, sodium and potassium impurities of not larger than 0.3 ppm, is used. The powdery silica raw material is filled in a vessel made of a high-purity synthetic quartz glass and the vessel is placed in an electric oven, the atmosphere in which is capable of being varied in a controlled manner. An oxidizing gas containing an increased proportion of oxygen is introduced in the electric oven. The composition of the oxidizing gas is not particularly limited, and, as specific examples of the oxidizing gas, there can be mentioned a pure oxygen gas and an oxygen/nitrogen (1:1) mixed gas. The silica filled in the electric oven is heated to a temperature of 800 to 1,000° C. and maintained at that temperature for a period of 2 to 4 hours, and thereafter, cooled within the oven.

A powdery graphite is treated with, for example, chlorine so that the content of each of iron, sodium, potassium and titanium in the graphite becomes not larger than 1 ppm. A mold is made from the thus-obtained high-purity graphite powder.

A porous high-purity graphite layer having a bulk density of from 0.1 to 1.5 g/cm3 and having a content of each of iron, sodium, potassium and titanium of not larger 1 ppm is placed on the inner wall of the graphite mold. One or more graphite layers can be placed on the inner wall of the mold. By placing the porous high-purity graphite layer or layers on the inner wall of the mold, the following benefits are obtained.

(i) The reaction between the graphite mold and the silica filled in the mold is avoided or minimized, and thus, damage of the mold can be prevented.

(ii) The graphite mold and the silica filled in the mold exhibit different thermal expansions, but, thermal stress-cracking of the mold can be avoided in the course of cooling the molten silica-filled mold because the intervening graphite layer has a function of reducing the thermal stress.

(iii) The gas generated by the reaction of the intervening porous graphite layer and the silica filled in the mold can be escaped through the porous graphite layer, and thus, the molded silica glass contains no bubbles therein.

As examples of the porous high-purity graphite layer having a bulk density of 0.1 to 1.5 g/cm$^3$, there can be mentioned a graphite felt dealt with purification, a graphite sheet and a build-up of high-purity graphite powder.

As a preferable example of the graphite felt, there can be mentioned those which are made by weaving or combining together carbon fibers and have a bulk density of 0.1 to 0.4 g/cm$^3$. Such graphite felts are commercially available and can be used in the present invention. The graphite felt preferably has a thickness of 2 to 10 mm.

As preferable examples of the graphite sheet, there can be mentioned those having a bulk density of 0.1 to 0.4 g/cm$^3$, and which are made from a fabric of carbon fibers and which are commercially available. The graphite sheet preferably has a thickness of 2 to 10 mm.

As preferable examples of the graphite powder capable of forming a build-up thereof as a porous high-purity graphite layer, there can be mentioned high-purity graphite powders having a particle size of 0.1 to 1 mm.

The graphite felt, the graphite sheet and the build-up of graphite powder have good stretchability and air permeability, and thus, the above-mentioned benefits (i), (ii) and (iii) can be attained. Especially the graphite felt has better stretchability and air permeability than those of the graphite sheet. Therefore the graphite felt is more preferable in view of the benefits (i), (ii) and (iii) as the porous high-purity graphite layer. However, the graphite felt has a problem that the consumption of graphite due to the reaction between the graphite and the silica is larger than that of the graphite sheet, and thus, it is difficult to make the silica glass having completely flat and smooth surfaces. In contrast, the graphite sheet has advantages in that the consumption of graphite due to the reaction between the graphite and the silica is smaller than that of the graphite felt, and has a flat and smooth surface, and thus, gives a silica glass article having an enhanced flatness. Therefore a suitable porous graphite layer should be chosen depending upon the particular nature required for the silica glass article. For example, the graphite felt is placed on parts of the inner surface of the mold for defining the inner and outer peripheral surfaces of a silica glass ring, and the graphite sheet is placed on a part of the inner surface of the mold for defining the bottom surface of the silica glass ring.

The high-purity graphite mold having the graphite layer or layers on the inner surface thereof is filled with the above-mentioned high-purity crystalline quartz powder or high-purity amorphous silica powder, which has been heat-treated in an oxidative atmosphere in the electric oven.

Then the high-purity quartz or silica powder-filled graphite mold is placed in an electric oven, and is heated to a temperature of at least 1,700° C. under a reduced pressure to melt the high-purity quartz or silica powder. Thereafter the mold is cooled and the silica glass molding is taken out therefrom.

By using the above-mentioned high-purity crystalline quartz powder or amorphous silica powder and employing the above-mentioned production conditions, a high-purity transparent silica glass molding can be obtained, which have the above-mentioned characteristics, namely, contain iron, sodium and potassium impurities each in an amount of 0.01 to 0.3 ppm, and a hydroxyl group in an amount of 0 to 3 ppm. Among the iron impurities contained therein, the content of metallic iron having a valency of +0 is not larger than 0.1 ppm. Further, this transparent silica glass molding is characterized as, even when the glass is maintained at a temperature in the range of from 900 to 1,400° C. for at least 20 hours, exhibiting an extinction coefficient of not larger than 0.009 at a wavelength of 400 nm, and being not discolored as visually examined.

The composition of the high-purity transparent silica glass can be analyzed by the following procedures.

(1) Content of Iron, Sodium and Potassium Impurities

The silica glass is treated with hydrofluoric acid. The treated silica glass is analyzed by the inductively coupled plasma (ICP) mass spectrometry or the atomic absorption photospectrometry.

(2) Concentration of OH Group

The concentration of hydroxyl group in the transparent silica glass is determined as follows.

A transparent silica glass specimen with a thickness of 10 mm having optically abraded surfaces is prepared. The specimen is analyzed by the infrared absorption spectrum, and the concentration A of hydroxyl group is calculated from the following formula.

$$A[\text{ppm}]=0.01\times\log_{10}(I_1[\%]/I_2[\%])$$

wherein

A: concentration [ppm] of OH group $I_1$: transmittance [%] at a wavelength of 2.5 im $I_2$: transmittance [%] at a wavelength of 2.73 im (3) Content of Metallic Iron with Valency of +0

The valency of metallic iron in the transparent silica glass is determined by the electron spin resonance (ESR) spectrum. The method of determining by the ESR spectrum is not particularly limited. For example, the following method can be adopted. A rectangular parallelopiped specimen having a size of 7 mm×7 mm×10 mm is cut from the silica glass. The specimen has a weight of about 1 g.

The ESR spectrum of the specimen is measured. A large absorption peak appears in vicinity to g=2 and a small absorption peak appears in vicinity to g=4.2. It was identified by Griscom et al and Fristisch et al that the absorption peak appearing in vicinity to g=2 is due to the ferromagnetic resonance of metallic iron having a valency of +0 in the silica glass (D. L. Griscom, E. J. Friebele and D. B. Shinn, J. Appl. Phys. 50(3) 2402–2404 (1979); E. Fritsch and G. Clas, Non-cryst. Solid.), and by Uhmann et al that the absorption peak appearing in vicinity to g=4.2 is due to the ferromagnetic resonance of metallic iron having a valency of +3 in the silica glass (D. R. Uhlmann and N. J. Kreidl, Glass Science and Technology, Academic Press, Inc. (1990) Chapter 3).

The method of determining the metallic iron having a valency of +0 will be more specifically described as follows.

A powdery synthetic silica having a content of iron element of not larger than 0.01 ppm is dispersed in super-pure-water, and $FeCl_3$ was added in an amount of 0.1, 0.2, 0.5, 0.7, 1, 5 and 10 ppm as the weight of iron element. The $FeCl_3$-added slurry is thoroughly stirred at a temperature of 80° C. and then is evaporated to remove water. The thus-obtained powder is heat-treated at a temperature of 400 to 800° C. in a hydrogen atmosphere for about 4 hours to reduce the valency of iron in the powder to +0.

The ESR spectrum of the powder is measured, and the integrated intensity of the ferromagnetic resonance absorption appearing in vicinity of g=2 is calculated to prepare a calibration curve of the integrated intensity. The iron content is determined according to the calibration curve. In this analysis, a solution of TEMPOL (4-hydroxy-2,2,6,6-tetramethyl-piperidine-oxyl) in benzene is used as a first reference standard, and a ruby crystal (á-$Al_2O_3$ containing $Cr^{+3}$) is used as a second reference standard.

The requirements of the above-mentioned contents of impurities are crucial for the characteristics of the transparent silica glass as, even when the glass is maintained at a temperature in the range of from 900 to 1,400° C. for at least 20 hours, exhibiting an extinction coefficient of not larger than 0.009 at a wavelength of 400 nm, and being not colored as visually examined. If the content of each of iron, sodium and potassium impurities, or the content of OH group, or the content of Fe with a valency of +0 exceeds the above-specified limit, when the transparent silica glass is maintained at a temperature of 900 to 1,400° C. for at least 20 hours, the transmittance of the glass in the visible-ultraviolet region is reduced to a significant extent, and the extinction coefficient at a wavelength of 400 nm is below 0.009, and discoloration is observed by visual examination.

The invention will now be described by the following examples that by no means limit the scope of the invention.

EXAMPLE 1

A natural quartz powder containing the impurities shown in Table 1 was used as a raw material. A graphite mold with a ring-shaped cavity, having an outer frame diameter of 410 mm, an inner frame diameter of 380 mm and a depth of 75 mm was prepared. A high-purity graphite felt made of high-purity graphite containing the impurities shown in Table 1 and having a bulk density of 0.1 g/cm$^3$ and a thickness of 5 mm was placed on the inner wall of the outer mold frame, and a high-purity graphite felt made of the same high-purity graphite and having the same bulk density and a thickness of 2 mm was placed on the outer wall of the inner mold frame. A high-purity graphite sheet made of high-purity graphite containing the impurities shown in Table 1 and having a bulk density of 1.2 g/cm$^3$ and a thickness of 0.4 mm was placed on the bottom of the ring-shaped cavity of the mold.

The high-purity graphite mold having placed therein the graphite felts and sheet was charged with the natural quartz powder. The charged natural quartz powder was heated from room temperature to a temperature of 1,600° C. at an elevation rate of 5° C./minute in vacuo, and then from 1,600° C. to a temperature of 1,850° C. at a rate of 2° C./minute. Then the molten silica was maintained at 1,850° C. in vacuo for 15 minutes and then in a nitrogen atmosphere under a pressure of 1.7 kgf/cm$^2$ for 5 minutes. Thereafter the mold was gradually cooled.

The thus-made transparent silica glass ring were analyzed to determine the contents of impurities. The results are shown in Table 1. As seen from Table 1, the concentration of each of the iron, sodium and potassium impurities is within the range of 0.001 to 0.3 ppm.

TABLE 1

| | Li | Na | K | Ca | Al | Fe | Cu | Mg | Ti |
|---|---|---|---|---|---|---|---|---|---|
| | (in ppm) | | | | | | | | |
| Raw material powder | 0.2 | 0.1 | 0.06 | 0.4 | 6.9 | 0.1 | <0.01 | — | — |
| Graphite mold | — | <0.05 | <0.1 | <0.04 | <0.08 | 0.2 | <0.08 | <0.02 | <0.09 |

TABLE 1-continued (in ppm)

|  | Li | Na | K | Ca | Al | Fe | Cu | Mg | Ti |
|---|---|---|---|---|---|---|---|---|---|
| Graphite felt | — | <0.05 | <0.1 | 3.0 | <0.08 | 0.08 | <0.08 | <0.02 | <0.09 |
| Graphite sheet | — | <1.0 | <0.5 | <0.5 | <0.3 | <1.0 | — | <0.1 | — |
| Transparent silica glass | 0.2 | 0.2 | 0.05 | 0.4 | 7.6 | 0.2 | — | 0.08 | 1.1 |

A specimen having a thickness of 10 mm was cut from the transparent silica glass ring, and both surfaces thereof were optically abraded. Infrared spectroscopic analysis of the specimen revealed that it had a light transmittance of 87.5% at a wavelength of 2.5 im and 86.0% at a wavelength of 2.73 im. The concentration of hydroxyl group in the transparent silica glass as calculated from the light transmittances was 0.75 ppm.

Figure 2:
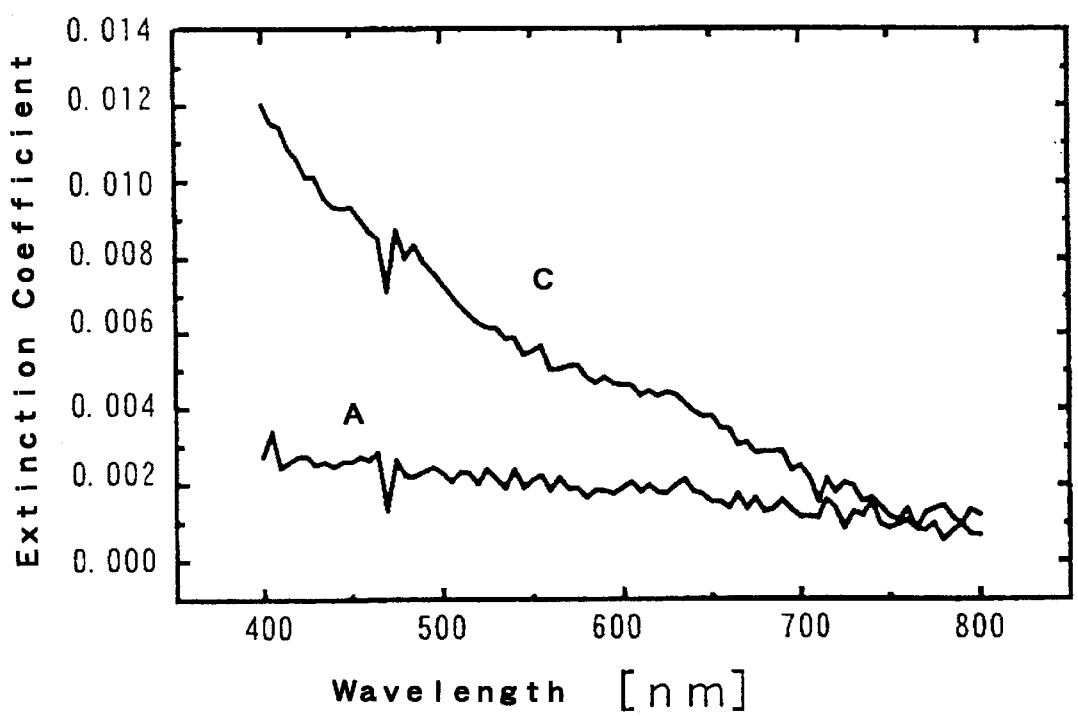
FIG. 2 shows visible spectrums of a silica glass made in Example 1 and that made in Comparative Example 2.

The transparent silica glass was maintained at a temperature of 1,150° C. in the air for 66 hours. The silica glass did not exhibit coloration as visually examined when it was maintained at that temperature in the air for 66 hours. The visible spectrum of the silica glass is shown as curve A in FIG. 1 and FIG. 2. The visible spectroscopic analysis revealed that it had an extinction coefficient of 0.003 at a wavelength of 400 nm.

A rectangular parallelepiped specimen having a size of 7 mm×7 mm×10 mm was cut from each of two kinds of the transparent silica glass, one of which had been maintained at 1,150° C. in the air for 66 hours, and the other of which had been the as-molded glass and had not been maintained at 1,150° C. in the air at all, and the ESR spectrum was measured on the specimen. The content of metallic iron having a valency of +0 was below 0.1 ppm as calculated from the integrated intensity of the ferromagnetic resonance absorption appearing in vicinity to g=2.

COMPARATIVE EXAMPLE 1

A transparent silica glass ring was made natural quartz powder having the composition shown in Table 2.

A graphite mold having a ring-shaped cavity, having an outer frame diameter of 255 mm, an inner frame diameter of 100 mm and a depth of 47.5 mm was prepared. A graphite felt made of graphite containing the impurities shown in Table 2 and having a thickness of 5 mm was placed on the inner wall of the outer mold frame, and the same graphite felt was placed on the outer wall of the inner mold frame. A graphite sheet made of high-purity graphite containing the impurities shown in Table 2 and having a thickness of 0.4 mm was placed on the bottom of the ring-shaped cavity of the mold.

The graphite mold having placed therein the graphite felts and sheet was charged with 2.3 kg of the natural quartz powder. The charged natural quartz powder was heated from room temperature to a temperature of 1,600° C. at an elevation rate of 5° C./minute in vacuo, and then from 1,600° C. to a temperature of 1,850° C. at a rate of 2° C./minute. Then the molten silica was maintained at 1,850° C. in vacuo for 15 minutes and then in a nitrogen atmosphere under a pressure of 1.7 kgf/cm$^2$ for 5 minutes. Thereafter the mold was gradually cooled.

The thus-made transparent silica glass ring were analyzed to determine the contents of impurities. This analysis was conducted on the upper part of the silica glass ring and the lower part thereof. The results are shown in Table 2.

A specimen having a thickness of 10 mm was cut from the transparent silica glass ring, and both surfaces thereof were optically abraded. Infrared spectroscopic analysis of the specimen revealed that it had a light transmittance of 86.6% at a wavelength of 2.5 im and 85.4% at a wavelength of 2.73 im. The concentration of hydroxyl group in the transparent silica glass as calculated from the light transmittances was 0.62 ppm. The transparent silica glass was maintained at a temperature of 1,150° C. in the air for 20 hours. The silica glass became colored as visually examined when it was maintained at that temperature in the air for 20 hours. The visible spectrum of the silica glass is shown as curve B in FIG. 1. The visible spectroscopic analysis revealed that it had an extinction coefficient of 0.298 at a wavelength of 400 nm.

A rectangular parallelepiped specimen having a size of 7 mm×7 mm×10 mm was cut from the silica glass which had

TABLE 2

(in ppm)

|  | Li | Na | K | Ca | Al | Fe | Cu | Mg | Ti |
|---|---|---|---|---|---|---|---|---|---|
| Raw material powder | 0.20 | 1.0 | 0.50 | 0.70 | 8.30 | 0.70 | <0.02 | — | — |
| Graphite mold | — | <0.05 | 0.1 | 74.0 | 0.4 | 15 | <0.08 | <0.02 | 28.0 |
| Graphite felt | — | 10 | — | 70.0 | 10 | 30 | — | 5 | — |
| Graphite sheet | — | <1.0 | <0.5 | <0.5 | <0.3 | <1.0 | — | <0.1 | — |
| Transparent silica glass |  |  |  |  |  |  |  |  |  |
| Upper part of ring | 0.12 | 0.54 | 0.33 | 13.2 | 7.05 | 5.66 | — | 0.31 | 1.69 |
| Lower part of ring | 0.13 | 0.74 | 0.25 | 0.80 | 7.03 | 2.54 | — | 0.08 | 1.61 | been maintained at 1,150° C. in the air for 20 hours, and the ESR spectrum was measured. The content of metallic iron having a valency of +0 was 4 ppm as calculated from the integrated intensity of the ferromagnetic resonance absorption appearing in vicinity to g=2.

COMPARATIVE EXAMPLE 2

A transparent silica glass ring was made natural quartz powder having the composition shown in Table 3.

TABLE 3

| | (in ppm) | | | | | | | | |
|---|---|---|---|---|---|---|---|---|---|
| | Li | Na | K | Ca | Al | Fe | Cu | Mg | Ti |
| Raw material powder | 0.2 | 0.1 | 0.06 | 0.4 | 6.9 | 0.1 | <0.01 | — | — |
| Graphite mold | — | <0.05 | <0.1 | <0.04 | <0.08 | 0.2 | <0.08 | <0.02 | <0.09 |
| Graphite felt | — | <0.05 | <0.1 | 3.0 | <0.08 | 0.08 | <0.08 | <0.02 | <0.09 |
| Graphite sheet | — | <1.0 | <0.5 | <0.5 | <0.3 | <1.0 | — | <0.1 | — |
| Transparent silica glass | | | | | | | | | |
| Upper part of ring | 0.08 | 0.18 | 0.10 | 11.1 | 6.13 | 0.19 | — | 0.15 | 1.48 |
| Lower part of ring | 0.08 | 0.17 | 0.05 | 0.45 | 6.09 | 0.13 | — | 0.04 | 1.35 |

A high-purity graphite mold with a ring-shaped cavity, having an outer frame diameter of 255 mm, an inner frame diameter of 100 mm and a depth of 47.5 mm was prepared. A high-purity graphite felt made of high-purity graphite containing the impurities shown in Table 3 and having a thickness of 5 mm was placed on the inner wall of the outer mold frame, and a high-purity graphite felt made of the same high-purity graphite and having a thickness of 2 mm was placed on the outer wall of the inner mold frame. A graphite sheet made of high-purity graphite containing the impurities shown in Table 3 and having a thickness of 0.4 mm was placed on the bottom of the ring-shaped cavity of the mold.

The graphite mold having placed therein the graphite felts and sheet was charged with 2.3 kg of the natural quartz powder. The charged natural quartz powder was heated from room temperature to a temperature of 1,600° C. at an elevation rate of 5° C./minute in vacuo, and then from 1,600° C. to a temperature of 1,850° C. at a rate of 2° C./minute. Then the molten silica was maintained at 1,850° C. in vacuo for 15 minutes and then in a nitrogen atmosphere under a pressure of 1.7 $kgf/cm^2$ for 5 minutes. Thereafter the mold was gradually cooled.

The thus-made transparent silica glass ring were analyzed to determine the contents of impurities. This analysis was conducted on the upper part of the silica glass ring and the lower part thereof. The results are shown in Table 3. As seen from Table 3, the content of each of the iron, sodium and potassium impurities is in the range of 0.01 to 0.3 ppm.

A specimen having a thickness of 10 mm was cut from the transparent silica glass ring, and both surfaces thereof were optically abraded. Infrared spectroscopic analysis of the specimen revealed that it had a light transmittance of 88.5% at a wavelength of 2.5 im and 85.4% at a wavelength of 2.73 im. The concentration of hydroxyl group in the transparent silica glass as calculated from the light transmittances was 1.5 ppm.

The transparent silica glass was maintained at a temperature of 1,300° C. in the air for 20 hours. The silica glass became slightly colored as visually examined when it was maintained at that temperature in the air for 20 hours. The visible spectrum of the silica glass is shown as curve C in FIG. 2. The visible spectroscopic analysis revealed that it had an extinction coefficient of 0.012 at a wavelength of 400 nm.

A rectangular parallelepiped specimen having a size of 7 mm×7 mm×10 mm was cut from the silica glass which had been maintained at 1,300° C. in the air for 20 hours, and the ESR spectrum was measured. The content of metallic iron having a valency of +0 was 0.2 ppm as calculated from the integrated intensity of the ferromagnetic resonance absorption appearing in vicinity to g=2.

EXAMPLE 2

Figure 3A:
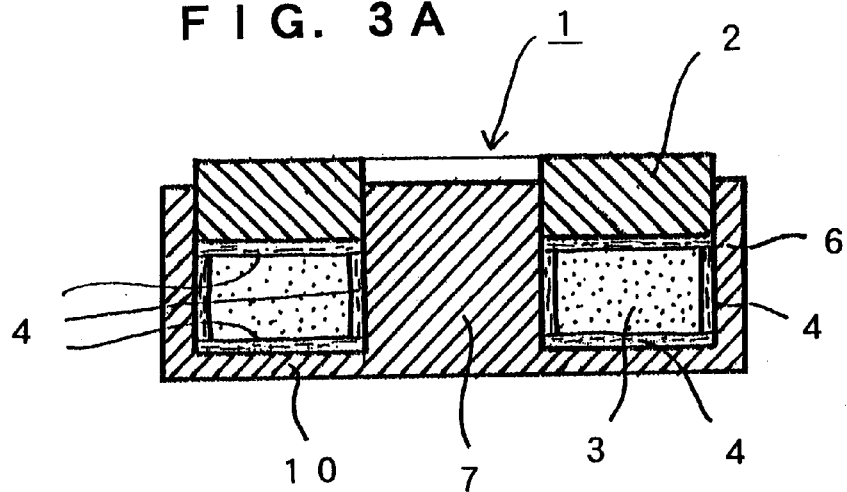
FIG. 3A, FIG. 3B and FIG. 3C show cross-sectional views of three different types of molding apparatuses used in Example 2.
Figure 3B:
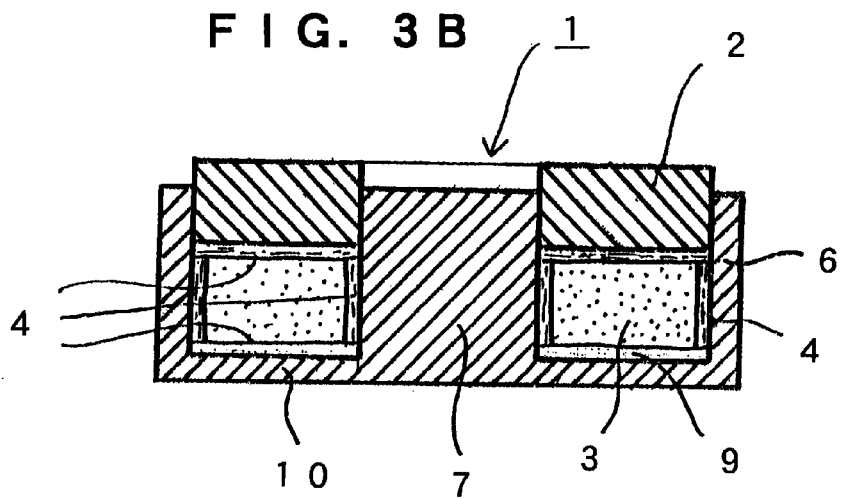
Figure 3C:
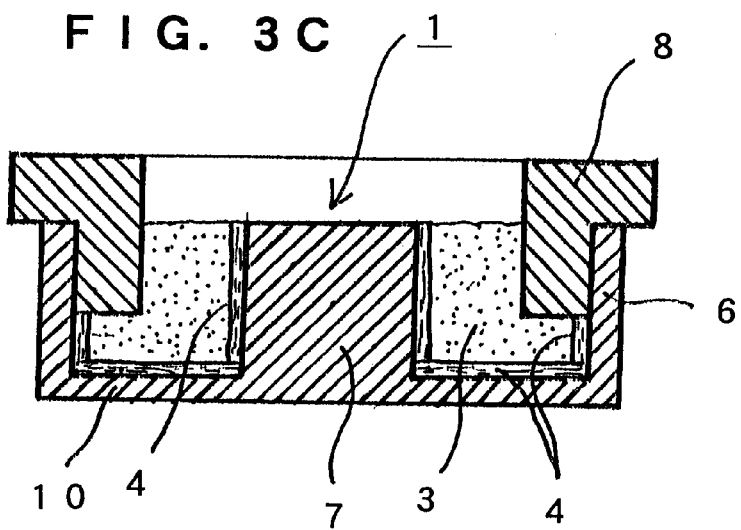

Transparent silica glass rings were made by using three different types of molding apparatuses illustrated in FIG. 3A, FIG. 3B and FIG. 3C.

The contents of impurities in the raw material and the materials for the high-purity graphite mold, high-purity graphite felt and high-purity graphite sheet, which are capable of being used for making the transparent silica glass, are shown in Table 4 (powdery silica raw material), Table 5 (high-purity graphite mold), Table 6 (high-purity graphite felt), Table 7 (high-purity graphite sheet), and Table 8 (high-purity graphite powder).

TABLE 4

| | Impurity (ppm) | | | | | |
|---|---|---|---|---|---|---|
| Silica powder | Na | K | Ca | Fe | Ti | B |
| Crystalline quartz | 0.1 | 0.06 | 0.4 | 0.1 | 0.9 | <0.1 |
| Amorphous silica | 0.1 | <0.1 | 0.4 | 0.5 | 1.1 | <0.1 |

TABLE 5

| | Impurity (ppm) | | | | | |
|---|---|---|---|---|---|---|
| Graphite for mold | Na | K | Ca | Fe | Ti | B |
| Isotropic graphite | <0.01 | <0.01 | <0.02 | 0.03 | 0.01 | <0.01 |
| Anisotropic graphite | <0.01 | 0.01 | 0.01 | 0.02 | 0.01 | <0.01 |

TABLE 6

| | Impurity (ppm) | | | | | |
|---|---|---|---|---|---|---|
| Graphite felt | Na | K | Ca | Fe | Ti | B |
| High-purity product | 0.09 | 0.06 | 5.0 | 0.5 | 0.09 | 0.5 |
| Ultra-high-purity product | 0.02 | 0.03 | 2.6 | 0.3 | 0.06 | 0.2 |

TABLE 7

| | Impurity (ppm) | | | | | |
|---|---|---|---|---|---|---|
| Graphite sheet | Na | K | Ca | Fe | Ti | B |
| Ultra-high-purity product | 0.01 | <0.1 | 0.1 | 0.15 | <0.1 | 0.1 |

TABLE 8

| | Impurity (ppm) | | | | | |
|---|---|---|---|---|---|---|
| High-purity graphite powder | Na | K | Ca | Fe | Ti | B |
| High-purity product | 0.01 | 0.01 | 0.01 | 0.03 | <0.03 | <0.01 |

Three different molds having structures illustrated in FIG. 3A, FIG. 3B and FIG. 3C, all of which have a ring diameter of 400 mm, an inner diameter of 240 mm and a height of 70 mm, and a ring-shaped cavity, were prepared from high-purity graphite having a density of 1.7 g/cm³ as shown in Table 8.

In the mold 1 illustrated in FIG. 3A, a high-purity graphite felt 4 (shown in Table 6) having a thickness of 5 mm and a bulk density of 0.2 g/cm³ was placed on the inner surface of an outer mold frame 6, the outer surface of an inner mold frame 7, and the mold bottom 10. The mold cavity was charged with a crystalline quartz powder 3 (shown in Table 4) having an average particle diameter of 0.2 mm, and the same high-purity graphite felt 4 as mentioned above was placed on the charged quartz powder 3. A high-purity graphite loading mold lid 2 having a thickness (height) of 50 mm was placed on the upper surface of the graphite felt 4.

In the mold 1 illustrated in FIG. 3B, the same high-purity graphite felt 4 as that used for the mold 1 illustrated in FIG. 3A was placed on the inner surface of an outer mold frame 6 and the outer surface of an inner mold frame 7, and a high-purity graphite sheet 9 (shown in Table 7) having a thickness of 0.4 mm and a bulk density of 1.0 g/cm³ was placed on the mold bottom 10. Further, the same high-purity graphite felt 4 was placed on the charged quartz powder 3, and the same high-purity graphite loading mold lid 2 as that used for the mold 1 of FIG. 3A was placed on the upper surface of the graphite felt 4.

In the mold 1 illustrated in FIG. 3C, the same high-purity graphite felt 4 as that used for the mold of FIG. 3A was placed on the inner surface of an outer mold frame 6, the outer surface of an inner mold frame 7, and the mold bottom 10. A high-purity graphite felt 4 was not placed on the charged quartz powder 3 and the graphite loading mold lid 2 was not placed thereon, but, a high-purity graphite peripheral loading ring 8 was placed on the outer mold frame 6.

Each of the molds 1 was placed in an electrical resistance carbon heater, and heated from room temperature to a temperature of 1,850° C. in vacuo over a period of 8 hours. Then the molten silica was maintained at 1,850° C. in vacuo for 30 minutes and then a nitrogen gas was introduced. Thereafter the mold was gradually cooled in the nitrogen gas atmosphere.

Figure 4A:
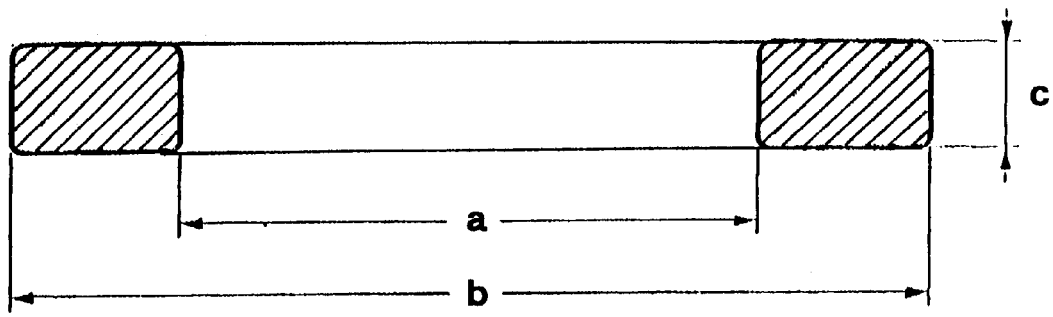
FIGS. 4A, FIG. 4B and FIG. 4C show cross-sectional views of silica glass rings made by using the apparatuses illustrated in FIG. 3A, FIG. 3B and FIG. 3C, respectively.
Figure 4B:
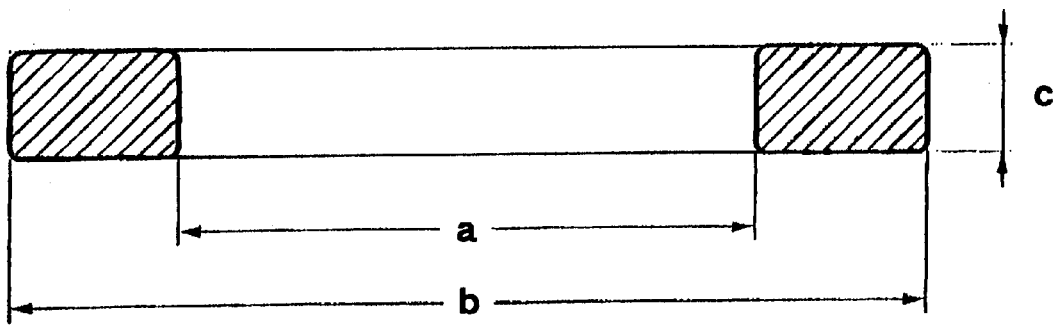
Figure 4C:
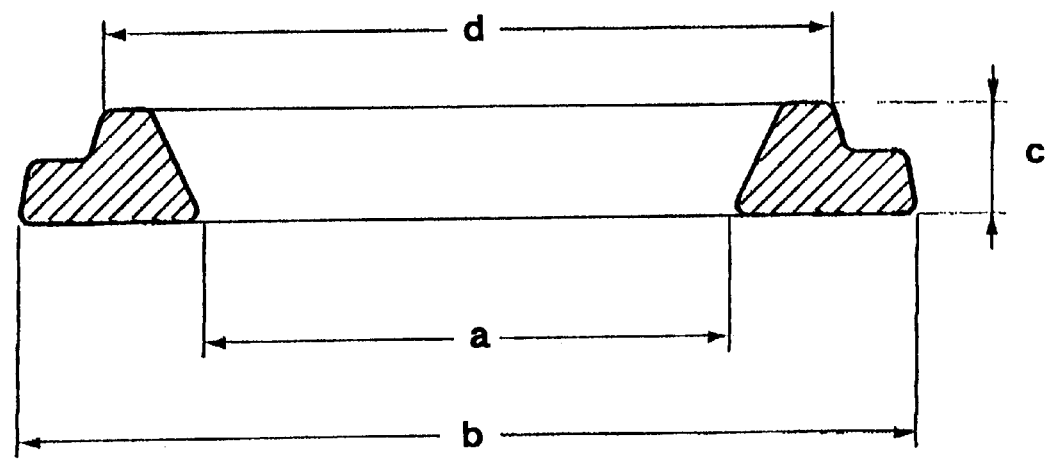

The three silica glass rings thus made by using molds illustrated in FIG. 3A, FIG. 3B and FIG. 3C were transparent and contained only a negligible amount of bubbles therein, and had cross-sectional shapes as illustrated in FIG. 4A, FIG. 4B and FIG. 4C, respectively. The dimensions of the three silica glass rings were as follows.

FIG. 4A, inner diameter "a": 236 mm, outer diameter "b": 373 mm, height "c": 44 mm.

FIG. 4B, inner diameter "a": 236 mm, outer diameter "b": 373 mm, height "c": 44 mm.

FIG. 4C, inner diameter "a": 216 mm, outer diameter "b": 367 mm, height "c": 46 mm, outer top diameter "d": 298 mm.

The bottom of the silica glass ring of FIG. 4B exhibited a good flatness. The silica glass ring of FIG. 4C had a circular peripheral flange-like step portion at the upper outer peripheral thereof.

The three silica glass rings were analyzed by the same procedures as in the preceding examples. The contents of impurities in the silica glass rings are shown in Table 9. As seen from Table 9, the contents of impurities in the silica glass rings were approximately the same as those in the high-purity silica powder used as a raw material.

TABLE 9

| Silica glass ring | Impurities (ppm) | | | | | |
| --- | --- | --- | --- | --- | --- | --- |
| | Na | K | Ca | Fe | Ti | B |
| FIG. 4A | <0.1 | 0.1 | 0.5 | 0.1 | 1.2 | <0.1 |
| FIG. 4B | 0.1 | 0.1 | 0.4 | 0.2 | 0.9 | <0.1 |
| FIG. 4C | <0.1 | 0.1 | 0.4 | 0.1 | 0.9 | <0.1 |

When the above-mentioned procedures were repeated wherein a build-up layer of high-purity graphite powder containing the impurities shown in Table 8 was used instead of the above-mentioned high-purity graphite felt and the high-purity graphite sheet, a transparent silica glass ring containing impurities in amounts similar to those mentioned above was obtained.

When the above-mentioned procedures were repeated wherein amorphous silica powder (shown in Table 4) was used as a raw material instead of the crystalline quartz powder, similar results were obtained. Further, when anisotropic graphite was used instead of isotropic graphite as high-purity graphite material for construction of a mold, similar results were also obtained.

The transparent silica glass of the present invention has a high purity and contains a hydroxyl group only a negligible amount, and therefore, it exhibits a high viscosity at a high temperature and has excellent properties as a material for jigs used for the production of a semiconductor. The content of metallic iron of a valency of +0 in the silica glass is not larger than 0.1 ppm, and thus, even when the transparent silica glass is maintained at a temperature of 900 to 1,400° C. over long hours, the silica glass does not become colored. This property also is advantageous as a material for jigs used for the production of semiconductor devices.

The transparent silica glass made by the process of the present invention has a high purity and is available as a large size article, for example, an article having an outer diameter of 300 to 550 mm and a height of about 100 mm. Therefore, the silica glass is beneficial from viewpoints of reduced material cost and enhanced durability of a graphite mold, as compared with a conventional silica glass article which is made by machining of a quartz glass block.

The transparent silica glass of the present invention is especially useful as material for jigs used for the production of semiconductors, for example, a flange of a reaction tube, a liner for an inner surface of a reactor in an etching apparatus, and parts of a sheeting type apparatus.

What is claimed is:

1. A high-purity transparent silica glass comprising iron, sodium and potassium impurities, wherein said iron impurities are present in an amount of 0.01 to 0.2 ppm and said sodium and potassium impurities are present each in an amount of 0.01 to 0.3 ppm, said glass having a hydroxyl group content in an amount of 0 to 0.75 ppm; wherein the content of metallic iron having a valency of 0 is not larger than 0.1 ppm; said transparent silica glass having, even when the glass is maintained at a temperature in the range of from 900 to 1,400° C. for at least 20 hours, an extinction coefficient of not larger than 0.003 at a wavelength of 400 nm, said glass not being colored as visually examined.

2. The transparent silica glass according to claim 1, which is in the shape of a ring.

* * * * *